US 9,152,985 B2

(12) United States Patent
Wakabayashi (10) Patent No.: US 9,152,985 B2
(45) Date of Patent: Oct. 6, 2015

(54) SYSTEM AND METHOD FOR ENCRYPTING AND REWARDING USERS FOR SHARING STREAMING MEDIA BETWEEN MOBILE DEVICES OVER AN AD-HOC NETWORK

(75) Inventor: Kazuya Wakabayashi, Tokyo (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 247 days.

(21) Appl. No.: 13/333,236

(22) Filed: Dec. 21, 2011

(65) Prior Publication Data
US 2012/0197738 A1      Aug. 2, 2012

(30) Foreign Application Priority Data

Jan. 31, 2011   (JP) .................................. 2011-019036

(51) Int. Cl.
G06Q 30/02       (2012.01)
G06F 21/10       (2013.01)
G06Q 10/10       (2012.01)

(52) U.S. Cl.
CPC .......... *G06Q 30/0273* (2013.01); *G06Q 10/101* (2013.01); *G06Q 30/0214* (2013.01); *G06Q 30/0276* (2013.01)

(58) Field of Classification Search
CPC ................................................. G06Q 30/0214
See application file for complete search history.

(56) References Cited

U.S. PATENT DOCUMENTS

| 5,825,883 | A  | * | 10/1998 | Archibald et al. ............... 705/53 |
| 6,601,093 | B1 | * | 7/2003  | Peters ........................... 709/220 |
| 6,772,340 | B1 | * | 8/2004  | Peinado et al. ............... 713/168 |
| 6,816,596 | B1 | * | 11/2004 | Peinado et al. ............... 380/277 |
| 7,039,615 | B1 | * | 5/2006  | Gajjala et al. .................... 705/59 |
| 7,076,467 | B1 | * | 7/2006  | Chatani ........................... 705/52 |
| 7,127,613 | B2 | * | 10/2006 | Pabla et al. ..................... 713/171 |
| 7,209,900 | B2 | * | 4/2007  | Hunter et al. ................... 705/58 |
| 7,308,573 | B2 | * | 12/2007 | Kostal et al. ................... 713/156 |
| 7,426,750 | B2 | * | 9/2008  | Cooper et al. .................. 726/26 |
| 7,461,338 | B2 | * | 12/2008 | Landau et al. ................. 715/237 |
| 7,562,301 | B1 | * | 7/2009  | Wolff et al. .................... 715/727 |
| 7,574,747 | B2 | * | 8/2009  | Oliveira et al. ................. 726/29 |
| 7,577,999 | B2 | * | 8/2009  | Narin et al. ..................... 726/27 |

(Continued)

FOREIGN PATENT DOCUMENTS

JP       2008217142 A       9/2008

OTHER PUBLICATIONS

Grimm, Ruidiger et al, A Friendly Peer-to-Peer File Sharing System with Profit but Without Copy Protection Intelligent Internet Computing, 2002.*

(Continued)

*Primary Examiner* — Scott L Jarrett
(74) *Attorney, Agent, or Firm* — Matthew B. Dernier, Esq.

(57) ABSTRACT

A processor-implemented method includes: acknowledging, using a first affiliator identifier obtained from content assigned the first affiliator identifier, an application from a user other than an owner of the content for the same type of content as the accessed content, an affiliator identifier being used to identify an affiliator for the purpose of providing affiliate service, embedding, in the content provided to the other user, a second affiliator identifier identifying the other user; providing the content assigned the second affiliator identifier to the other user; and identifying an affiliator owning the content assigned the first affiliator identifier, based on the first affiliator identifier.

3 Claims, 7 Drawing Sheets

(56) References Cited

U.S. PATENT DOCUMENTS

| | | | |
|---|---|---|---|
| 7,620,362 B2* | 11/2009 | Brown et al. | 455/3.03 |
| 7,647,614 B2* | 1/2010 | Krikorian et al. | 725/94 |
| 7,685,642 B2* | 3/2010 | Gilliam et al. | 726/26 |
| 7,693,280 B2* | 4/2010 | Evans et al. | 380/44 |
| 7,698,164 B2* | 4/2010 | Rothschild | 705/14.34 |
| 7,707,614 B2* | 4/2010 | Krikorian et al. | 725/94 |
| 7,711,647 B2* | 5/2010 | Gunaseelan et al. | 705/59 |
| 7,797,197 B2* | 9/2010 | Kumar et al. | 705/26.1 |
| 7,805,375 B2* | 9/2010 | Fox et al. | 705/59 |
| 7,817,960 B2* | 10/2010 | Tan et al. | 455/11.1 |
| 7,861,312 B2* | 12/2010 | Lee et al. | 726/27 |
| 7,873,988 B1* | 1/2011 | Issa et al. | 726/4 |
| 7,882,045 B1* | 2/2011 | Cole et al. | 706/12 |
| 7,882,046 B1* | 2/2011 | Kizhakkekalathil et al. | 706/12 |
| 7,904,028 B2* | 3/2011 | Tan | 455/73 |
| 7,917,402 B2* | 3/2011 | Rolf et al. | 705/26.1 |
| 7,921,223 B2* | 4/2011 | Evans et al. | 709/231 |
| 7,925,973 B2* | 4/2011 | Allaire et al. | 715/248 |
| 7,930,347 B2* | 4/2011 | Maxwell et al. | 709/205 |
| 7,934,263 B2* | 4/2011 | Singer et al. | 726/26 |
| 7,975,062 B2* | 7/2011 | Krikorian et al. | 709/231 |
| 7,987,490 B2* | 7/2011 | Ansari et al. | 725/82 |
| 8,051,454 B2* | 11/2011 | Krikorian et al. | 725/94 |
| 8,090,619 B1* | 1/2012 | Hunter et al. | 705/26.1 |
| 8,095,555 B2* | 1/2012 | Wakasa et al. | 707/770 |
| 8,112,474 B2* | 2/2012 | Miyoshi et al. | 709/203 |
| 8,214,431 B2* | 7/2012 | Miyajima et al. | 709/204 |
| 8,219,612 B2* | 7/2012 | Le Scouarnec et al. | 709/203 |
| 8,224,715 B2* | 7/2012 | Kumar et al. | 705/26.7 |
| 8,238,540 B1* | 8/2012 | Duva et al. | 379/265.01 |
| 8,275,716 B2* | 9/2012 | Lao | 705/51 |
| 8,296,393 B2* | 10/2012 | Alexander et al. | 709/217 |
| 8,386,469 B2* | 2/2013 | Reuther et al. | 707/715 |
| 8,606,684 B2* | 12/2013 | Bi et al. | 705/37 |
| 8,719,272 B2* | 5/2014 | Tan | 707/740 |
| 2002/0111912 A1* | 8/2002 | Hunter et al. | 705/52 |
| 2003/0005159 A1* | 1/2003 | Kumhyr | 709/246 |
| 2003/0037261 A1* | 2/2003 | Meffert et al. | 713/201 |
| 2004/0128324 A1* | 7/2004 | Sheynman et al. | 707/200 |
| 2005/0027859 A1* | 2/2005 | Alvisi et al. | 709/224 |
| 2005/0066353 A1* | 3/2005 | Fransdonk | 725/29 |
| 2006/0029093 A1* | 2/2006 | Van Rossum | 370/432 |
| 2006/0156283 A1* | 7/2006 | Landau et al. | 717/114 |
| 2006/0270395 A1* | 11/2006 | Dhawan et al. | 455/418 |
| 2006/0287916 A1* | 12/2006 | Starr et al. | 705/14 |
| 2007/0038567 A1* | 2/2007 | Allaire et al. | 705/50 |
| 2007/0038931 A1* | 2/2007 | Allaire et al. | 715/526 |
| 2007/0087756 A1* | 4/2007 | Hoffberg | 455/450 |
| 2007/0168543 A1* | 7/2007 | Krikorian et al. | 709/231 |
| 2007/0299737 A1* | 12/2007 | Plastina et al. | 705/26 |
| 2008/0005113 A1* | 1/2008 | Li | 707/9 |
| 2008/0086422 A1* | 4/2008 | Wolff et al. | 705/50 |
| 2008/0120156 A1* | 5/2008 | Nusbaum | 705/7 |
| 2008/0140502 A1* | 6/2008 | Birnholz et al. | 705/10 |
| 2008/0160908 A1* | 7/2008 | Khedouri et al. | 455/3.06 |
| 2008/0177751 A1* | 7/2008 | Tan | 707/10 |
| 2008/0216106 A1* | 9/2008 | Maxwell et al. | 725/1 |
| 2008/0235268 A1* | 9/2008 | Miyoshi et al. | 707/102 |
| 2008/0248740 A1* | 10/2008 | Lazovsky et al. | 455/3.01 |
| 2009/0043783 A1* | 2/2009 | Wakasa et al. | 707/10 |
| 2009/0210697 A1* | 8/2009 | Chen et al. | 713/153 |
| 2009/0215477 A1* | 8/2009 | Lee et al. | 455/466 |
| 2009/0271283 A1* | 10/2009 | Fosnacht et al. | 705/26 |
| 2010/0042487 A1* | 2/2010 | Barazani | 705/14.13 |
| 2010/0080163 A1* | 4/2010 | Krishnamoorthi et al. | 370/312 |
| 2010/0082727 A1* | 4/2010 | Zalewski | 709/203 |
| 2010/0121735 A1* | 5/2010 | Shimooka | 705/27 |
| 2010/0205029 A1* | 8/2010 | Asherman et al. | 705/8 |
| 2010/0268628 A1* | 10/2010 | Pitkow et al. | 705/34 |
| 2011/0112911 A1* | 5/2011 | Birnholz et al. | 705/14.69 |
| 2011/0191163 A1* | 8/2011 | Allaire et al. | 705/14.39 |
| 2011/0231242 A1* | 9/2011 | Dilling et al. | 705/14.42 |
| 2012/0124368 A1* | 5/2012 | Driessen | 713/153 |
| 2012/0197738 A1* | 8/2012 | Wakabayashi | 705/14.69 |
| 2013/0054402 A1* | 2/2013 | Asherman et al. | 705/26.2 |
| 2013/0185163 A1* | 7/2013 | Krikorian et al. | 705/14.69 |

OTHER PUBLICATIONS

Grimm, Rudiger et al., Peer-to-Peer Music Sharing with Profit but Withoug Copy Protection Proceedings of the Second International Conference on WEB Delibering of Music, IEEE, 2002.*

Nutzel, Jurgen et al., Patato System and Signed Media Format—an Alternative Approach to Online Music Business Proceedings of the Third International Conference on Wed Delivering of Music, IEEE, 2003.*

Cigno, Renato et al., Peer-to-Peer Beyond File Sharing: Whare are P2P Systems Going? IEEE, 2009.*

Furini, Marco, Mobile Music Distribution: A Multichannel Approach Advances in Multimidea, vol. 2011, 2011.*

Zhang, Zhan et al., MARCH: A Distributed Incentive Scheme for Peer-to-Peer Networks IEEE INFOCOM'07, 2007.*

Wierzbicki, Adam, Peer-to-peer Direct Sales Proceedings of the Fifth International Conference on Peer-to-Peer COmputing, IEEEE, 2005.*

Serrao, Carlos et al., Can Digital Content E-Commerce Profit from P2P Networks? IADIS, 2005.*

Nutzel, Jurgen et al., A Mobile Peer-to-Peer Application for Distribute Recommendation and Re-sale of Music (Potato System) Proceedings fo the Second International Conference on Automated Production of Cross Media Content for Multi-Channel Distribution, IEEE, 2006.*

Liu, Yu et al., Peer-assisted Content Delivery Network for Live Streaming: Architecture and Practice IEEE Computer Society, 2008.*

Yin, Alan Kin Wah et al., Decentralized media streaming infrastructure (DeMSI): An adaptive and high-performance peer-to-peer content delivery network, Journals of Systems Architecture, vol. 52, 2006.*

Kwon, Jin B. et al., Distributed Multimedia Streaming over Peer-to-Peer Networks Ninth International Conference on Parallel and Distributed Computer, 2003.*

Ding, Choon Hoong et al., Peer-to-Peer Networks for Content Sharing 2005.*

Kang, Seung-Seok et al., Mobile Peer Membership Management to Support Multimedia Streaming ICDCS Workshops 2003.*

Chen, Xi et al., Service and P@P based secure media sharing in mobile commerce environments Springer, Nov. 16, 2010.*

Liu, Yang et al., Implementing Digital Right Management in P2P Content Sharing System ICA3PP, LNCS, 2007.*

Mahyar, Salek et al., You Share, I Share: Network Effects and Economic Incentives in P2P File-Sharing Systems Internet and Network Economics, Lecture Notes in Computer Science, vol. 6484, 2010.*

Iwata, Tetsuya et al., A DRM system suitable for P2P content delivery and the study on its implementation IEEE, 2003.*

Sung Jae-Youn et al., DRM Enabled P2P Architecture ICACT2006, Feb. 20-22, 2006.*

Kalker, Ton et al., Music2Share—Copyright Compliant Music Sharing in P2P Systems Proceedings of the IEEE, vol. 92, No. 6, Jun. 2004.*

Boh, Phillip, P2P sharing: Commercialize it! INDICARE Project, Jun. 23, 2006.*

Golle, Philippe et al., Incentives for Sharing in Peer-to-Peer Networks Proceeding EC '01 Proceedings of the 3rd ACM conference on Electronic Commerce, 2001.*

Yokohata, Yuki et al., Construction of Credible Ubiquitous P2P Content Exchange Communities EUC Workshops, IFIP International Federation for Information Processing, 2005.*

Babaioff, Moshe et al., Incentives in Peer-to-Peer Systems—Chapter 23 Nisan, Noam et al., Algorithmic game theory, Cambridge University Press, 2007.*

Truskovsky, Alexander, Protocol and Architecutre for the Secure Delivyery of High-Value Digital Content Concordia University, Nov. 2005.*

(56) References Cited

OTHER PUBLICATIONS

Voida, Stephen et al., Share and Share Alike: Exploring the User Interface Affordances of File Sharing CHI'06 Proceedings, Apr. 22-27, 2006.*
Liu, Kuan Ting et al., Social Playlist: Enabling Touch Points and Enriching Ongoing Relationships Through Collaborative Mobile Music Listening, MobileHCI 2008, ACM, Sep. 2-5, 2008.*
Baumann, Stephan et al., BluetunA: Let Your Neighbour Know What Music You Like CHI 2007, ACM, Apr. 28-May 3, 2007.*
Wiberg, Mikael, FolkMusic: A Mobile Peer-to-Peer Entertainment System Proceedings of IMSA 2003, Aug. 13-15, 2003.*
Pering, Trevor et al., Face-to-Face Media Sharing using Wireless Mobile Devices Proceedings of the Seventh IEEE International Symposium on Multimedia, ISM'05, 2005.*
Bach, Erik et al., Bubbles: Navigation Multimedia Content in Mobile Ad-hoc Networks ACM, 2003.*
Ostergren, Mattias et al., Sound Pryer: truly mobile joint music listening in Extended Abstracts of UBICOMP'02, 2002.*
Voida, Amy et al., Listening in: Proactices Surrounding iTunes Music Sharing CHI2005, ACM, Apr. 2-7, 2005.*
Bassoli, Arianna et al., Chapter 8: TUNA: Socialising Music Sharing on the Move Consuming Music Together: Social and Collaborative Aspects of Music Consumption Technologies, Springer, 2006B.*
Bassoli, Arianna et al., TunA: Synchronized Music-Sharing on Handheld Devices Adjunct Proc. of Ubicomp'04, 2004.*
Jacobson, Mattias et al., Push!Music: Intelligent Music Sharing on Mobile Devices in Adjunct Proceedings of UBICOMP'05, Seventh International Conference on Ubiquitous Computing, 2005.*
Hakansson, Maria et al., Gifts from friends and strangers: A study of mobile music sharing ECSW'07, 2007.*
Hakansson, Maria et al., Facilitating Mobile Music Sharing and Social Interaction with Push!Music Proceedings of the $40^{th}$ Hawaii International Conference on System Sciences, 2007.*

* cited by examiner

| AFFILIATE ID | NAME | AGE | NATIONAL-ITY | CONTENT OWNED |
|---|---|---|---|---|
| AID-A | A | 34 | X | CID1, CID2 |
| AID-B | B | 23 | X | — |
| ⋮ | ⋮ | ⋮ | ⋮ | ⋮ |
| AID-C | C | 12 | Y | CID3 |

| CONTENT ID | LANGUAGE | TARGET AGE |
|---|---|---|
| CID1 | LANGUAGE A, LANGUAGE B, LANGUAGE C | NO LIMITS |
| CID2 | LANGUAGE A, | 15 OR OLDER |
| ⋮ | ⋮ | ⋮ |
| CID3 | LANGUAGE B | 12 OR OLDER |

SYSTEM AND METHOD FOR ENCRYPTING AND REWARDING USERS FOR SHARING STREAMING MEDIA BETWEEN MOBILE DEVICES OVER AN AD-HOC NETWORK

BACKGROUND OF THE INVENTION

1. Field of the Invention

The present invention relates to a method of providing identifier-assigned content assigned an identifier and an ID management device for managing the identifier.

2. Description of the Related Art

Recently, there has been rapid development in technology for communicating over a network such as the Internet. Opportunities are growing for consumers in general to exchange information on products over a network. In association with this, an advertisement model called an affiliate system is employed frequently. In an affiliate system, product information is posted on a blog, etc., a link to a site where the product can be purchased is established, and, when a viewer of the blog purchases the product via the link, an advertisement fee is paid to the manager of the blog.

In this advertisement model, one who posts product information is called an affiliator. In one variation of this advertisement model, an item in possession of an avatar provided in a virtual space (e.g., clothing worn by the avatar) is presented as a medium of advertisement so that the manager of the avatar is benefited as an affiliator (see patent document No. 1).

[Patent Document No. 1] JP 2008-217142

We have come to be aware of possibilities of providing a new distinctive edge to contents using the rapidly developing network communication technology. For example, building a system whereby a purchaser of an actual content, not content in a virtual space, can become an affiliator at the same time as purchasing the content will provide a potential purchaser with motivation to purchase the content.

SUMMARY OF THE INVENTION

The present invention addresses the aforementioned challenge and a purpose thereof is to provide a technology of allowing a purchaser of content to become an affiliator at the same as the purchase.

In order to meet the challenge, one embodiment of the present invention relates to a method of providing identifier-assigned content. The method comprises: acknowledging, using a first affiliator identifier obtained from content assigned the first affiliator identifier, an application from a user other than an owner of the content for the same type of content as the accessed content, an affiliator identifier being used to identify an affiliator for the purpose of providing affiliate service, embedding, in the content provided to the other user, a second affiliator identifier identifying the other user; providing the content assigned the second affiliator identifier to the other user; and identifying an affiliator owning the content assigned the first affiliator identifier, based on the first affiliator identifier.

Another embodiment of the present invention relates to an ID management device. The device comprises: a database configured to map an affiliator identifier, which is used to identify an affiliator for the purpose of providing affiliate service, to an affiliator; an ID assignment unit configured to embed an affiliator identifier in content; and an affiliator management unit configured to acquire a first affiliator identifier identifying a user applying for the purchasing of content, and a second affiliator identifier submitted along with the application for the purchase of the content and embedded in the content that prompted the user to purchase the content. The affiliator management unit refers to the database using the second affiliator identifier as a key and identifies an owner of the content that prompted the user to purchase the content, in order to pay an affiliate fee to the owner, and the ID assignment unit embeds the first affiliate identifier acquired by the affiliator management unit in the content sold to the user applying for a purchase of the content.

Still another embodiment of the present invention also relates to a method of providing identifier-assigned content. The method is implemented by a processor and comprises: acknowledging, using a first affiliator identifier obtained from content assigned the first affiliator identifier, an application from a user other than an owner of the content for a key to unlock the same type of content as the accessed content, an affiliator identifier being used to identify an affiliator for the purpose of providing affiliate service, embedding, in the key provided to the other user, a second affiliator identifier identifying the other user; providing the key assigned the second affiliator identifier to the other user; and identifying an affiliator owning the content assigned the first affiliator identifier, based on the first affiliator identifier.

Yet another embodiment of the present invention relates to a program executed in a mobile information terminal. The program implements modules in the mobile information terminal which comprise: a module configured to play back content assigned an affiliator identifier used to identify an affiliator for the purpose of providing affiliate service; a module configured to establish ad hoc communication with another mobile information terminal within a certain range where ad hoc connection can be established, while said content is being played back; a module configured to deliver streaming content to the other mobile information terminal with which ad hoc connection is established; and a module configured to transmit, when a user of the other mobile information terminal uses the affiliator identifier to apply for a purchase of content of the same type as said content, the affiliator identifier assigned to said content to the other mobile information terminal in order to use the transmitted affiliator identifier to identify the affiliator when paying an affiliate fee to the affiliator.

Optional combinations of the aforementioned constituting elements, and implementations of the invention in the form of methods, apparatuses, systems, computer programs, data structures, and recording mediums may also be practiced as additional modes of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described by reference to the preferred embodiments. This does not intend to limit the scope of the present invention, but to exemplify the invention.

Before describing the embodiment of the present invention, an affiliate model that represents a basis of the embodiment will be described.

Figure 9:
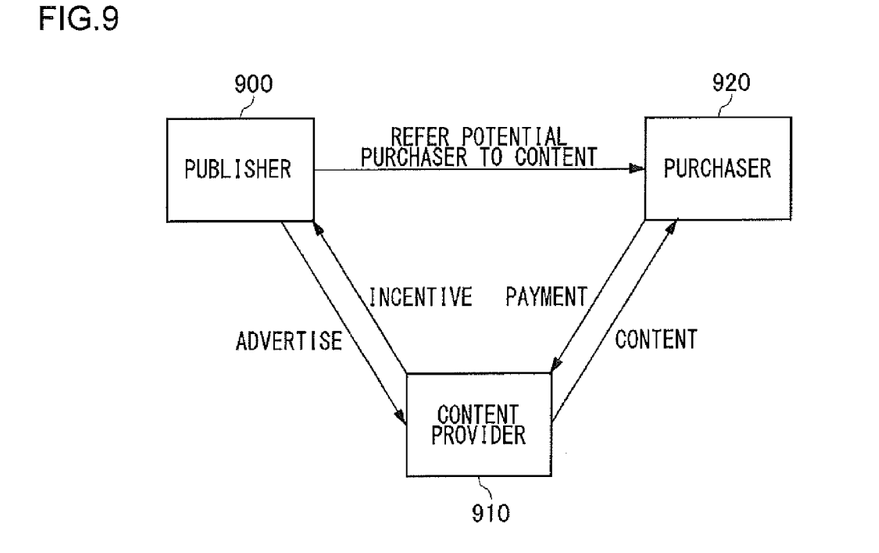
FIG. 9 shows an affiliate model that represents a basis of the embodiment.

FIG. 9 shows an affiliate model that represents a basis of the embodiment. A publisher 900 who is an affiliator refers a potential purchaser to a content product in his or her e-mail newsletter or web site (e.g., a blog) and provides a link to a web site of a company etc. which is a provider 910 of the product. When a purchaser 920 viewing an e-mail newsletter or a web site originated by the publisher 900 purchases the product in the web site of the provider 910 via the e-mail newsletter or the web site viewed, or registers himself or herself with the provider site, the provider 910 pays an affiliate fee to the publisher 900 as an incentive.

Generally, the publisher 900 who is an affiliator does not need to own a content product. The publisher 900 undertakes advertisement activities on behalf of the provider 910 by referring the purchaser 920 to a product. This saves the advertisement fee for the provider 910 and the provider 910 channels the advertisement fee thus saved to an affiliate fee paid to the publisher 900.

In such a model, the publisher 900 can expect an incentive by advertising the product and the provider 910 can expect reduction in the advertisement cost. However, the affiliate system is merely one form of product advertisement for the purchaser 920 and the purchaser 920 does not enjoy a special benefit by purchasing the product through the system.

Figure 1:
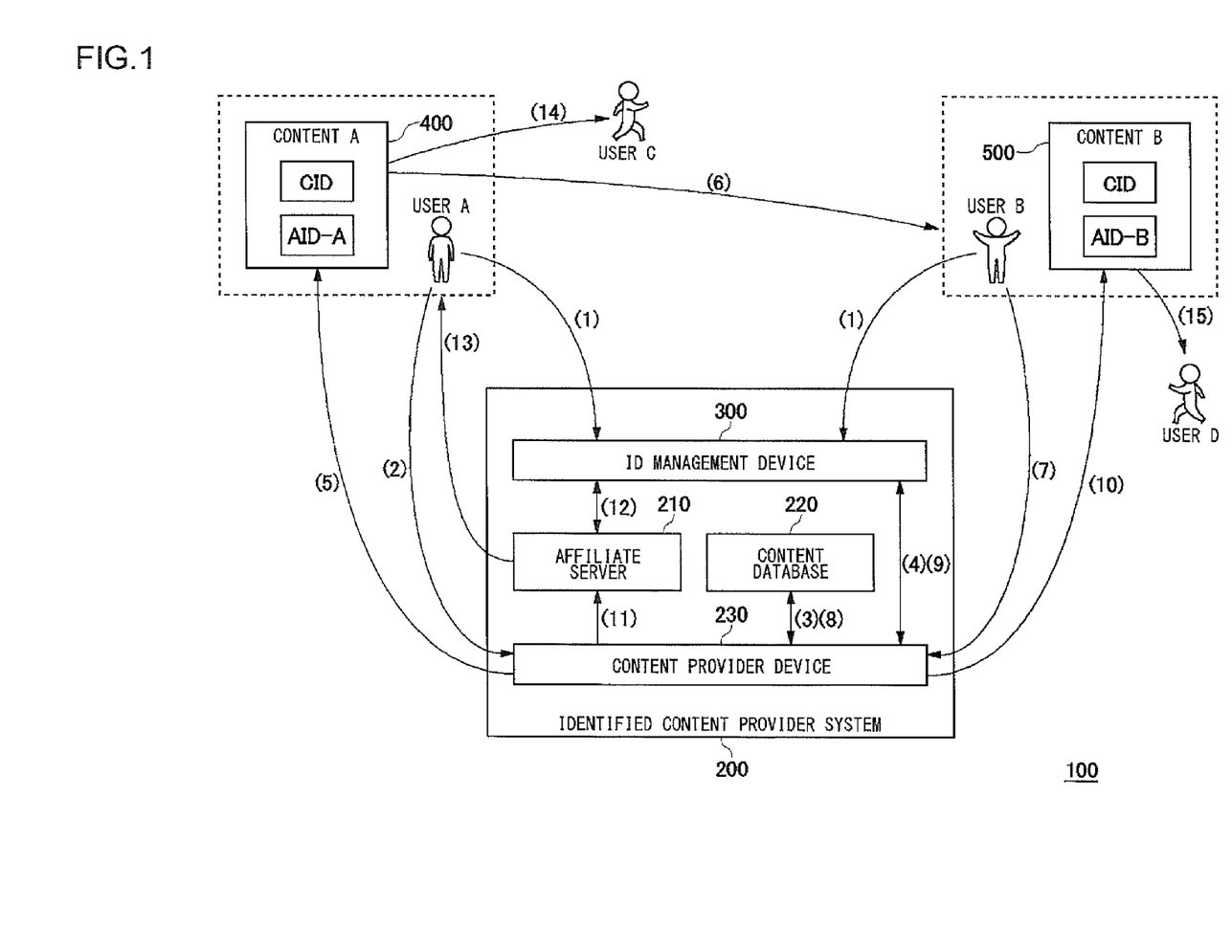
FIG. 1 shows an outline of an affiliate system according to the embodiment.

FIG. 1 shows an outline of an affiliate system 100 according to the embodiment. The affiliate system 100 according to the embodiment is built around a uniquely identified content provider system 200. The uniquely identified content provider system 200 comprises an ID (Identification) management device 300 which is a server managing affiliate users, a content provider device 230 which is a server providing content products, a content database 220 which is a database managing contents, and an affiliate server 210 which provides an affiliate fee to an affiliator.

A brief step-by-step description of the affiliate system according to the embodiment will be given below. Digital content such as games, movies, music, etc. will be described by way of example. Steps indicated by parenthesized numerals below correspond to parenthesized numerals of FIG. 1.

(1) As an essential requirement, user A and user B using the affiliate system 100 makes user registration with the ID management device 300. Where no distinction is necessary below, those who make user registration with the ID management device 300 will be referred to as "users". When a user registers with the ID management device 300, the user is assigned an affiliator identifier used to identify the user when the user provides affiliate service in the future.

(2) User A having an affiliator identifier applies for the purchasing of content with the content provider device 230. In this process, user A notifies the content provider device 230 of the user's own affiliator identifier. (3) This causes the content provider device 230 to acquire the content provided to user A from the content database 220.

(4) Upon receipt of the content provided to user A and the affiliator identifier of user A from the content provider device 230, the ID management device 300 assigns the affiliator identifier to the content. Subsequently, the ID management device 300 transmits the content assigned the affiliator identifier of user A to the content provider device 230.

(5) The content provider device 230 provides content 400 assigned the affiliator identifier of user A acquired from the ID management device 300 to user A. (6) User A acquires the content 400 assigned the affiliator identifier of user A from the content provider device 230. Subsequently, user A publicizes the content 400 by publishing the acquired content to another user B using a method described later. User B is referred to the content 400 assigned the affiliator identifier of user A by user A and acquires the affiliator identifier of user A.

(7) When user B referred to the content 400 by user A desires to purchase the content, user B not only communicates the affiliate identifier of user B to the content provider device 230 but also communicates the affiliator identifier of user A obtained from the content 400 of user A. (8) The content provider device 230 acquires the content to be provided to user B from the content database 220.

(9) When the ID management device 300 receives the content to be provided to user B and the affiliator identifier of user B from the content provider device 230, the ID management device 300 assigns the affiliator identifier to the content. Subsequently, the ID management device 300 transmits the content assigned the affiliator identifier of user B to the content provider device 230.

(10) The content provider device 230 provides content 500 assigned the affiliator identifier of user B acquired from the ID management device 300 to user B. (11) Subsequently, the content provider device 230 transmits the affiliator identifier of user A communicated from user B to the affiliate server 210.

(12) The affiliate server 210 transmits the affiliate identifier of user A acquired from the content provider device 230 to the ID management device 300. The ID management device 300 refers to an affiliator ID database 330 described later, using the affiliator identifier of user A acquired from the affiliate server 210 as a key, so as to acquire information identifying user A. (13) The affiliate server 210 provides an affiliate fee to user A based on the information identifying user A acquired from the ID management device 300.

(14) User A advertises the content 400 by publishing the content 400 assigned the affiliator identifier of user A to user C. (15) Likewise, user B advertises content 500 by publishing the content 500 assigned the affiliator identifier of user B to user D. Thus, a user purchasing content can become an affiliator at the same time as the purchase.

In FIG. 1, the affiliate identifier of user A is denoted in abbreviation as "AID-A" (Affiliate IDentifier-A) and the affiliate identifier of user B is denoted in abbreviation as "AID-B". The content identifier described later is denoted in abbreviation as "CID (Content IDentifier).

Figure 2:
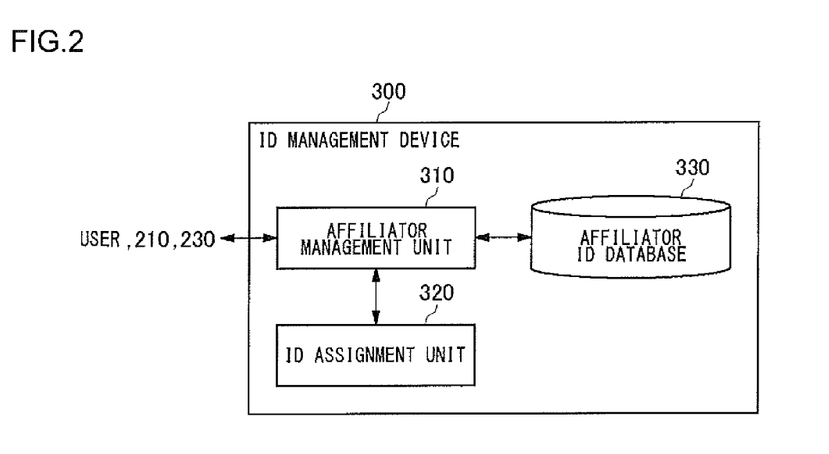
FIG. 2 schematically shows the functions of the ID management device according to the embodiment.

FIG. 2 schematically shows the functions of the ID management device 300 according to the embodiment. The ID management device 300 comprises an affiliator management unit 310, an ID assignment unit 320, and an affiliator ID database 330.

FIG. 2 shows the functional configuration to implement the ID management device 300 according to the embodiment and other aspects of the configuration are omitted from the illustration. The elements depicted in FIG. 2 as functional blocks for performing various processes are implemented by hardware such as a CPU, a main memory, or other LSI's, and by software such as a programs etc., loaded into the main memory. Therefore, it will be obvious to those skilled in the art that the functional blocks may be implemented in a variety of manners by hardware only, software only, or a combination of thereof.

When the affiliator management unit 310 acknowledges an application for user registration, the affiliator management unit 310 issues an affiliator identifier unique to the user and processes user registration. The affiliator management unit 310 also acquires the affiliator identifier of the user who applied for the purchasing of content and the content provided to the user from the content provider device 230.

The ID assignment unit 320 assigns the affiliator identifier of the user to the content provided to the user and acquired from the affiliator management unit 310. This is achieved by using a publicly known technology. For example, the ID assignment unit 320 may store the affiliator identifier in a predetermined header area in a digital content. The ID assignment unit 320 transmits the content assigned the affiliator identifier to the content provider device 230 via the affiliator management unit 310.

The affiliator management unit 310 may refer to the affiliator ID database 330 before delivering the affiliator identifier to the ID assignment unit 320 to verify whether the user who applied for the purchase of the content has made user registration properly.

When the user applies for the purchase of content with the affiliator management unit 310, the affiliator management unit 310 acquires the affiliator identifier of another user who referred the applying user to the content from the affiliate server 210. The affiliator management unit 310 refers to the affiliator ID database 330 using the acquired affiliator identifier as a key so as to retrieve information identifying the user to provide an affiliate fee to. The affiliator management unit 310 transmits the information to the affiliate server 210.

Figure 3:
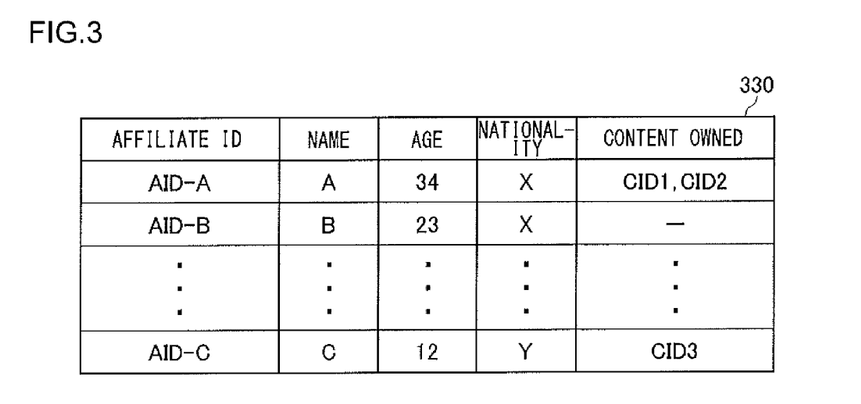
FIG. 3 schematically shows the structure of the affiliator ID database according to the embodiment.

FIG. 3 schematically shows the structure of the affiliator ID database 330 according to the embodiment. The affiliator ID database stores affiliator identifiers and information identifying the affiliators, mapping them to each other. More specifically, the information may include the name, age, nationality of the affiliator user and the CIDs of the contents owned by the user. The affiliator ID database 330 may store personal information necessary to process the payment of an affiliate fee (e.g., user's address, account number, etc.) as necessary (not shown).

When new user registration is made, or when a user purchases a new content, the affiliator management unit 310 updates relevant information in the affiliator ID database 330.

Figure 4:
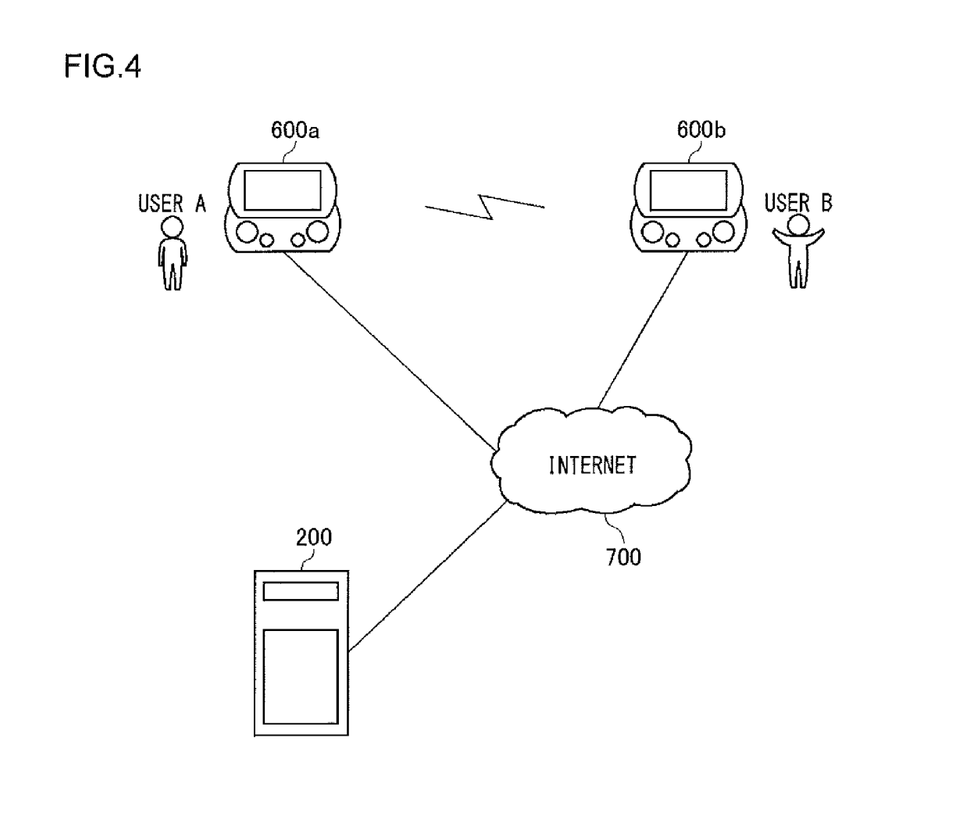
FIG. 4 schematically shows an example of a method of publishing content according to the embodiment.

FIG. 4 schematically shows an example of a method of publishing content according to the embodiment. In this example, it is assumed that user A and user B own mobile information terminals 600a and 600b, respectively, which will be generically referred to as mobile information terminals 600. The mobile information terminals 600a and 600b may communicate with each other on an ad hoc basis using, for example, wireless LAN (Local Area Network) standardized in IEEE802.11, or communicate with an external network such as the Internet 700 via a router such as an access point (not shown). For this reason, the mobile information terminal 600 is provided with a known wireless communication module such as a Wi-Fi (registered trademark) module (not shown).

User A who purchased content from the uniquely identified content provider system 200 uses the mobile information terminal 600a in possession of user A to play back the content 400 assigned an affiliator identifier. When the mobile information terminal 600b owned by user B arrives at a range where ad hoc connection with the mobile information terminal 600a can be established while the content 400 is being played back by the mobile information terminal 600a, the mobile information terminal 600a and the mobile information terminal 600b establish ad hoc connection automatically.

The mobile information terminal 600a delivers streaming content 400 being played back to the mobile information terminal 600b while ad hoc connection with the mobile information terminal 600b is being established. This provides user B an opportunity to access the content 400 being played back by user A who happens to be in the same train, for example. As well as delivering streaming content 400, the mobile information terminal 600a transmits the CID for identifying the content 400 and the affiliator identifier of user A who owns the content 400 to the mobile information terminal 600b.

Therefore, the mobile information terminal 600b retains the affiliator identifier of user A and the CID of the content 400 delivered in a stream. If user B likes the content he or she had the one-time opportunity to access using ad hoc connection, user B can purchase the content later using the CID.

More specifically, user B accesses the content provider device 230 in the uniquely identified content provider system 200 via the Internet 700 from the mobile information terminal 600b. User B communicates the CID and the affiliator identifier of user A acquired from the mobile information terminal 600a, and the affiliator identifier of user B, to the content provider device 230 to apply for the purchase of the content. As a result, user B can obtain the content 500 assigned the affiliator identifier of user B, and user A can receive an affiliate fee.

Figure 5:
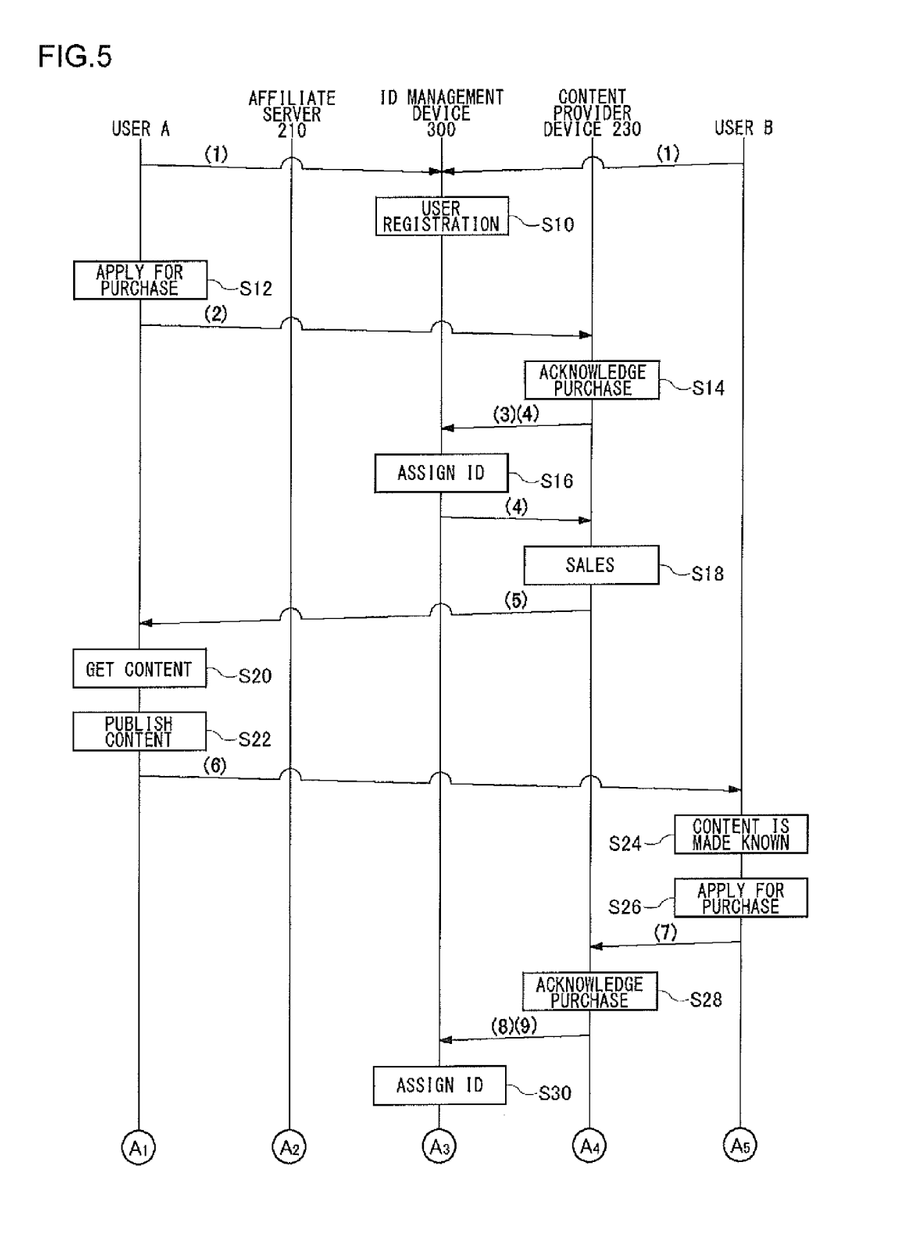
FIG. 5 shows the first part of the sequence chart showing the steps performed in the affiliate model according to the embodiment.

FIG. 5 shows the first part of the sequence chart showing the steps performed in the affiliate model according to the embodiment. In the sequence charts shown below, the steps in the respective components are denoted by a combination of S (initial letter of Step), which indicates "step", and a numeral. Each of the steps in the sequence chart is initiated when user A and user B make user registration in the ID management device 300. Parenthesized numerals in FIG. 5 and FIG. 6 described later correspond to the parenthesized numerals in FIG. 1.

User A and user B make user registration in the ID management device 300 (S10). As a result, information on user A and user B is newly stored in the affiliator ID database 330. User A applies for the purchasing of content using the user A's affiliator identifier (S12).

When the content provider device 230 acknowledges an application for the purchasing of content from user A (S14), the content provider device 230 acquires the content from the content database 220 and transmits the content to the ID management device 300 along with the affiliate identifier of user A. The ID assignment unit 320 in the ID management device 300 assigns the affiliator identifier of user A to the content provided to user A (S16).

The content provider device 230 sells and provides the content 400 assigned the affiliator identifier of user A acquired from the ID management device 300 to user A (S18). User A obtains the content 400 assigned the user A's affiliator identifier (S20). User A publishes the content 400 by playing back the content thus obtained in the mobile information terminal 600a (S22).

User B becomes aware of the content 400 being played back in the mobile information terminal 600a by receiving the content 400 delivered in a stream from the mobile information terminal 600a, using the mobile information terminal 600b in user B's possession (S24). When user B desires to purchase the content being played back in the mobile information terminal 600a, user B applies for the purchase of the content by communicating the CID, the affiliator identifier of user A, and the affiliator identifier of user B to the content provider device 230 (S26).

When the content provider device 230 acknowledges an application for the purchasing of content from user B (S28), the content provider device 230 acquires the content from the content database 220 and transmits the content to the ID management device 300 along with the affiliate identifier of user B. The ID assignment unit 320 in the ID management device 300 assigns the affiliator identifier of user B to the content provided to user B (S30).

Figure 6:
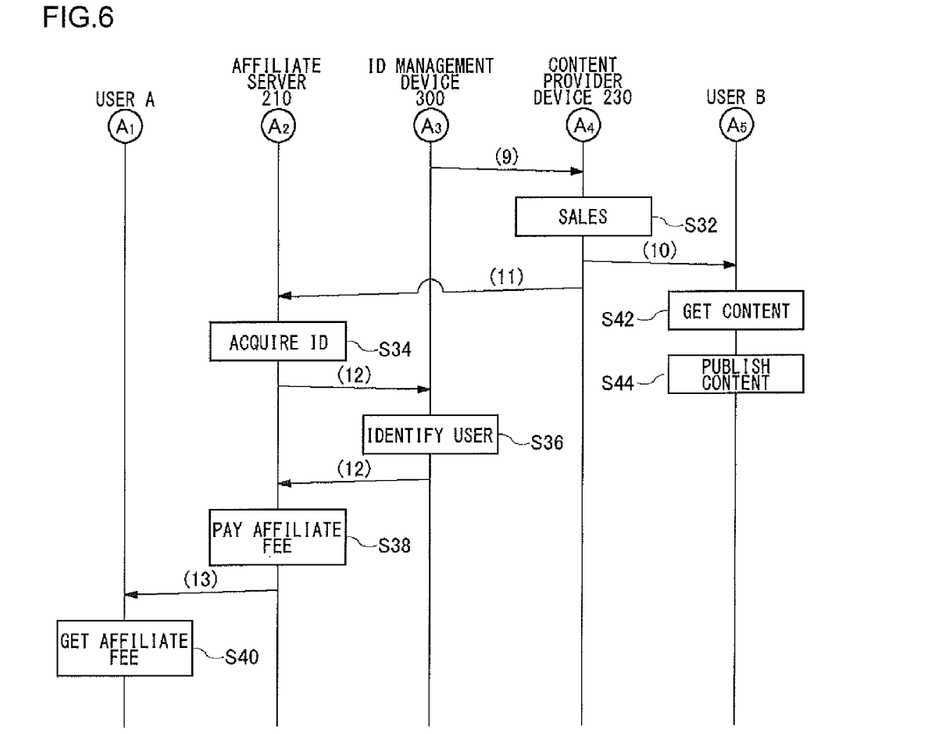
FIG. 6 shows the second part of the sequence chart showing the steps performed in the affiliate model according to the embodiment.

FIG. 6 shows the second part of the sequence chart showing the steps performed in the affiliate model according to the embodiment.

The content provider device 230 sells and provides the content 500 assigned the affiliator identifier of user B acquired from the ID management device 300 to user B (S32). The affiliate server 210 acquires the affiliator identifier of user A from the content provider device 230 (S34). The ID management device 300 refers to the affiliator ID database 330, using the affiliator identifier of user A acquired from the affiliate server 210 as a key, so as to acquire information identifying user A (S36).

The affiliate server 210 pays an affiliate fee to user A based on the information acquired from the ID management device 300 (S38). In this way, user A acquires the affiliate fee (S40). Meanwhile, user B obtains the content 500 assigned the affiliate identifier of user B (S42). User B publishes the content 500 by playing back the content thus obtained in the mobile information terminal 600b (S44).

By repeating the above steps, users can become an affiliator at the same as purchasing content.

The operation according to the configuration described above will be summarized below. A user registering with the uniquely identified content provider system 200 is assigned a unique affiliator identifier by the ID management device 300. Using the affiliator identifier, the user applies for the purchasing of content so that the user obtains content assigned the user's own affiliator identifier. The user publishes and advertises the content to another user by playing back the content in the mobile information terminal 600 capable of ad hoc connection. The user also communicates the user's own affiliator identifier to the other user. When the other user purchases the content from the content provider device 230, the user can receive an affiliate fee.

Described above is an explanation based on an exemplary embodiment. The embodiment is intended to be illustrative only and it will be obvious to those skilled in the art that various modifications to constituting elements and processes could be developed and that such modifications are also within the scope of the present invention.

The content played back in the mobile information terminal 600 is described above as being published using ad hoc connection, but the method of publishing content is non-limiting. Alternative methods of publishing content will be described below.

Affiliator identifiers managed by the ID management device 300 are configured to be linked with user ID's for an SNS (Social Network Service) that the device 300 is coordinated with. Each user maintains the user's web page in the SNS to use its social network services. A given user can post information on product purchase by another user by configuring the web page accordingly.

Figure 7:
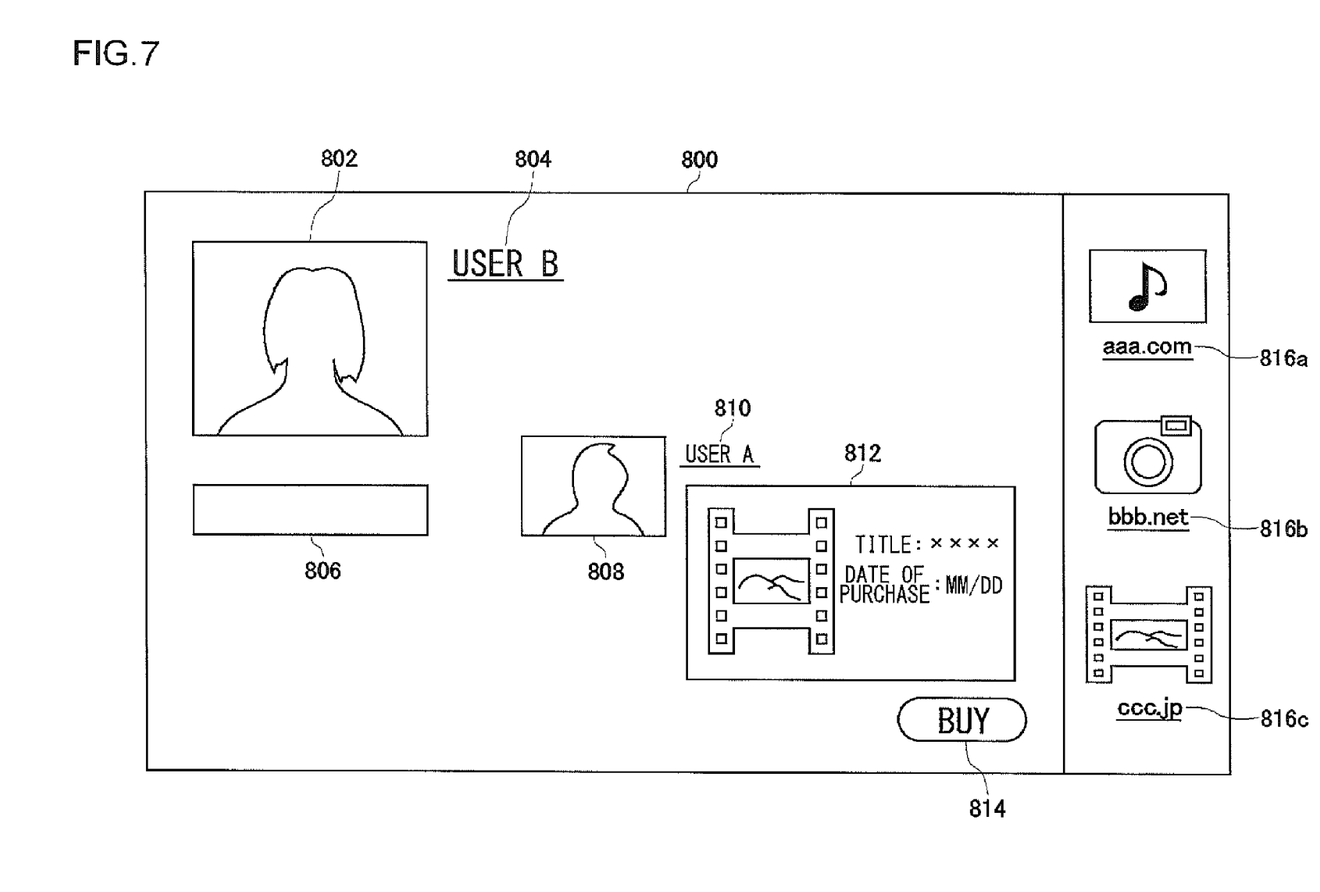
FIG. 7 shows an exemplary alternative method of publishing content according to the embodiment.

FIG. 7 shows an exemplary alternative method of publishing content according to the embodiment. The figure schematically shows the configuration of a web page 800 of user B to use the SNS.

In the web page 800, user B can post a portrait 802 of user B along with a user name 804 of user B. The portrait 802 may not be limited to a photo showing user B. Any photo may be posted as the portrait 802. The portrait 802 may not be posted. When user B configures the web page 800 to post information on product purchase by user A, an information field 812 showing information on product purchase by user A is displayed along with a portrait 808 of user A and a user name 810 of user A. An information field 806 shows information such as a comment of user A.

An information field 812 shows a title of a product purchased by user A, a date of purchase, etc. In the neighborhood of the information field 812 is displayed a banner 814 linked to a web page for purchasing the product purchased by user A from the content provider device 230. The web page 800 is configured such that, when user B purchases the same type of product as purchased by user A by clicking the banner 814, the affiliator identifier of user A is communicated to the content provider device 230. Thus, an affiliate fee is paid to user A.

In addition to the banner 814 for purchasing from the content provider device 230, an ordinary banner 816 may be posted in the web page 800. FIG. 7 shows a banner 816a for purchasing a music file and a banner 816b for purchasing a camera. A banner 816c for purchasing the same type of product as purchased by user A is also posted.

By clicking the banner 816c, user B can of course purchase the same type of product as purchased by user A. However, user B can become an affiliator himself or herself at the same time as purchasing the product from the content provider device 230. Since user B can expect an affiliate fee, this will provide user B motivation to purchase a product from the content provider device 230. The products advertised are the same but distinction is established by adding an expected value of an affiliate fee.

Thus, posting the banner 814 on the web page 800 of an SNS coordinated with affiliator identifiers gives a user advantage of not having to do any extra jobs other than displaying information on product purchase by another user. Meanwhile, the banner 814 may be posted on an ordinary blog, etc. instead of the web page 800 of an SNS. In this case, the inventive system can be achieved by allowing the content provider device 230 to provide software for generating the banner 814 from the content assigned an affiliator identifier. The software may be provided to a user at the time of purchasing content. Alternatively, the software may be provided as a web application that can be controlled on a dedicated web page.

In the above description, it is assumed that, when a user referred by another user to content purchases the content from the content provider device 230, the user can obtain the same content to which he or she is referred to. If the uniquely identified content provider system 200 is located in different countries or different regions in the world, the language used in the content that the user is referred to may not be the mother tongue of the user. Also, an age limit may apply for viewing or listening depending on the content.

In this respect, the content provider device 230 receiving an application for the purchase from a user may sell a proper content to the user based on the CID identifying the content and the affiliator identifier of the user. A detailed description will follow.

Figure 8:
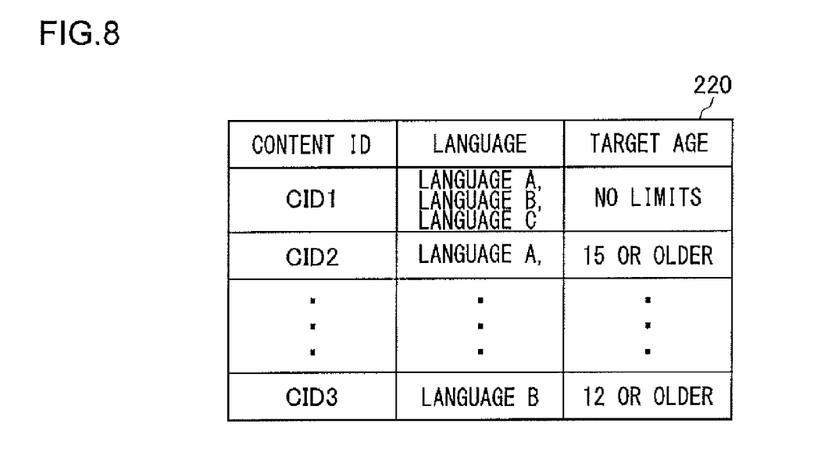
FIG. 8 schematically shows the structure of the content database according to the embodiment.

FIG. 8 schematically shows the structure of the content database 220 according to the embodiment. The content database 220 not only stores content but also stores the CID identifying the content, the language used in the content, and the target age of the content, mapping the information to each other.

When an application for the purchase of content is received from a user, the content provider device 230 transmits the affiliator identifier of the user to the ID management device 300. The affiliator management unit 310 in the ID management device 300 refers to the affiliator ID database 330 using the acquired affiliator identifier as a key so as to acquire the user's nationality and user's age.

The content provider device 230 refers to the content database 220 using the user's nationality acquired from the affiliator management unit 310 as a key. The content provider device 230 determines whether the content identified by the CID acquired at the time of application for the purchase includes the language used in the country of the user's nationality. If the content identified by the CID does not include the language used by the user's nationality, the content provider device 230 provides content having the same substance as the content requested for purchase and including the language used in the country of the user's nationality, embedding the affiliator identifier of the user in the content.

The content provider device 230 refers to the content database 220, using the user's age acquired from the affiliator management unit 310 as a key, so as to determine whether the user's age is the target age of the content desired by the user to be purchased. If the user's age is the target age of the content desired by the user to be purchased, the content provider device 230 provides the content. If not, the content provider device 230 notifies the user accordingly.

In this way, it is possible for the content provider device 230 to provide a proper content targeting the language used by the user and the user's age. If the user desires, the content provider device 230 may sell content including only the language not used by the user. This will be advantageous in that user preference is reflected.

In the above description, it is assumed that streaming content assigned the affiliator identifier of user A is delivered from the mobile information terminal 600a in possession of user A to the mobile information terminal 600b in possession of user B, and that the CID for identifying the content and the affiliator identifier of user A are retained in the mobile information terminal 600b. Instead, user A may publish the content in user A's possession assigned the affiliator identifier, by copying the content to user B. A detailed description will follow.

Even if user B receives content assigned the affiliator identifier of user A from user A, user B cannot play back the content in the mobile information terminal 600b in possession of user B if the content remains unmodified. To address this, the ID management device 300 registers an identifier uniquely assigned to the mobile information terminal 600 in possession of a registering user at the same time as processing user registration. The identifier uniquely assigned to the mobile information terminal 600 may be one assigned by a manufacturer on its own or a MAC address (Media Access Control address) of a communication module.

Content assigned an affiliator identifier is configured such that it can be played back only when the affiliator identifier registered with the ID management device 300 matches the identifier of the mobile information terminal 600 in which the content is played back. In this state, the content is "locked" so to speak. By applying a "key" assigning the affiliator identifier of user B to the content, user can play back the content.

Thus, user B applies for the purchase of a key for unlocking the content with the content provider device 230, using the affiliator identifier of user A obtained from the content assigned the affiliator identifier of user A. The ID assignment unit 320 in the ID management device 300 embeds the affiliator identifier of user B in the key provided to user B. User B unlocks the key having the affiliator identifier of user B embedded therein to the content acquired from user A. As a result, the content can be played back.

As described above, when user B applies for the purchase of a key to unlock the content, user B communicates the affiliator identifier of user A to the content provider device 230. This allows user A to receive an affiliate fee from the affiliate server 210. Generally, a key to unlock content is smaller in volume than the content main body. Therefore, the above variation is more advantageous to the user than when the content is directly downloaded from the content provider device 230 in that communication cost and communication time can be reduced.

The above description assumes digital content products. Alternatively, the embodiment may be used for tangible objects such as clothing or stationery. In this case, the inventive affiliate system can be implemented by assigning a bar code or an RFID (Radio Frequency IDentification) storing an affiliator identifier to a tangible object and allowing users to refer each other to products.

What is claimed is:

1. A method of providing identifier-assigned content, comprising:

receiving, at a content provider server and over a network, a request from a first user of a first terminal device to purchase a content item, the request including a first affiliator identifier of the first user;

digitally combining the content item and the first affiliator identifier together such that the content item and the first affiliator identifier are assigned to one another, and locking the content item with a key such that the first terminal device may unlock the content item for playback;

transmitting the combined content item and first affiliator identifier to the first terminal device over the network such that the first user may cause the first terminal device to unlock the content item and play back the content item on the first terminal device within a view and/or hearing range of a second user of a second terminal device;

receiving, at the content provider server and over a network, a request for a key to unlock the content item from the second terminal device operated by the second user, wherein the request includes identification of the content item, the first affiliator identifier, and a second affiliator identifier of the second user, and wherein the user requests the content item in response to: (i) an automatic, direct, wireless ad hoc connection between the first terminal device and the second terminal device, without operation of other devices, and in response to the second terminal device coming within range of the first terminal device and the first user playing back the content item on the first terminal device; and (ii) the first terminal device automatically streaming, and the second terminal device automatically receiving, the content item from the first terminal device, such that the second user is provided with a one-time, limited opportunity to view and/or listen to the content item during the ad-hoc connection without requiring that the second terminal device unlock the content item with the key;

embedding, at the content provider server, the second affiliator identifier into the key and sending the embedded key to the second terminal device over the network in response to the request so that the embedded key is available to the second user to unlock and execute the content item within the second terminal device; and using at the content provider server, the first affiliator identifier provided in the request to identify the first user and to provide the first user with a reward for causing the second user to request the key to unlock the content.

2. A server system, comprising:

a database configured to map respective affiliator identifiers with respective affiliators, each affiliator identifier being used to identify a respective one of the affiliators for the purpose of providing affiliate services;

a receiver configured to acquire, over a network, a request from a first user of a first terminal device to purchase a content item, the request including a first affiliator identifier of the first user;

a content provider device configured to digitally combine the content item and the first affiliator identifier together such that the content item and the first affiliator identifier are assigned to one another, and to lock the content item with a key such that the first terminal device may unlock the content item for playback;

a transmitting unit configured to transmit the combined content item and first affiliator identifier to the first terminal device over the network such that the first user may cause the first terminal device to unlock the content item and play back the content item on the first terminal device within a view and/or hearing range of a second user of a second terminal device;

an affiliator management unit configured to employ a request for a key to unlock the content item received from the second terminal device operated by the second user, wherein the request is received by the receiver over the network, and wherein the request includes identification of the content item, the first affiliator identifier, and a second affiliator identifier of the second user, and wherein the user requests the content item in response to: (i) an automatic, direct, wireless ad hoc connection between the first terminal device and the second terminal device, without operation of other devices, and in response to the second terminal device coming within range of the first terminal device and the first user playing back the content item on the first terminal device; and (ii) the first terminal device automatically streaming, and the second terminal device automatically receiving, the content item from the first terminal device, such that the second user is provided with a one-time, limited opportunity to view and/or listen to the content item during the ad-hoc connection without requiring that the second terminal device unlock the content item with the key;

the affiliator management unit further configured to refer to the database and to use the first affiliator identifier provided in the request to identify the first user such that the first user may be provided with a reward for causing the second user to request the key to unlock the content; and an ID assignment unit configured to embed the second affiliator identifier into the key, such that the embedded key may be sent to the second terminal device over the network, and such that the embedded key is available to the second user to unlock and execute the content item within the second terminal device.

3. A non-transitory computer readable recording medium encoded with a program operating to run on a first terminal device, the program comprising:

a module configured to play back content items on the first terminal device;

a module configured to transmit, over a network, a request to purchase a content item from a content provider system, the request including a first affiliator identifier of a first user of the first terminal device;

a module configured to receive, over the network, the content item from the content provider system, the content provider system having digitally combined the content item and the first affiliator identifier together such that the content item and the first affiliator identifier are assigned to one another, and the content provider system having locked the content item with a key such that the first terminal device may unlock the content item for playback within a view and/or hearing range of a second user of a second terminal device;

a module configured to: (i) establish an automatic, direct, wireless ad hoc connection with the second terminal device, without operation of other devices, and in response to the second terminal device coming within range of the first terminal device and the first user playing back the content item on the first terminal device; and (ii) automatically stream the content item from the first terminal device to the second terminal device, such that the second user is provided with a one-time limited opportunity to view and/or listen to the content item during the ad-hoc connection without requiring that the second terminal device unlock the content item with the key; and a module configured to copy the content item to the second terminal device with which the ad hoc connection is established, wherein:

the second terminal device is not permitted to execute the content item that has been assigned the first affiliator identifier without obtaining the key to unlock the content, a second affiliator of the second terminal device sends a request to the content provider system for the key to unlock the content item using the second terminal device, where the request includes identification of the content, the first affiliator identifier, and a second affiliator identifier of the second affiliator, and the first affiliator identifier acquired from the request is used to identify the first affiliator and to provide the first affiliator with a reward for causing the second affiliator to request the key to unlock the content.

* * * * *